United States Patent
Knirsch et al.

(10) Patent No.: US 10,384,811 B2
(45) Date of Patent: Aug. 20, 2019

(54) ELECTRICALLY POWERED PROPULSION SYSTEM FOR USE IN A SPACECRAFT

(71) Applicant: Airbus DS GmbH, Taufkirchen (DE)

(72) Inventors: Ulrich Knirsch, Markdorf (DE); Matti Haeberlein, Kressbronn a.B. (DE)

(73) Assignee: AIRBUS DS GMBH, Taufkirchen (DE)

( * ) Notice: Subject to any disclaimer, the term of this patent is extended or adjusted under 35 U.S.C. 154(b) by 759 days.

(21) Appl. No.: 14/921,984

(22) Filed: Oct. 23, 2015

(65) Prior Publication Data
US 2016/0114908 A1 Apr. 28, 2016

(30) Foreign Application Priority Data
Oct. 28, 2014 (EP) .................................... 14003653

(51) Int. Cl.
*B64G 1/40* (2006.01)
*F02K 9/90* (2006.01)
(Continued)

(52) U.S. Cl.
CPC .............. *B64G 1/405* (2013.01); *B64G 1/26* (2013.01); *F02K 9/84* (2013.01); *F02K 9/90* (2013.01); *F03H 1/0006* (2013.01)

(58) Field of Classification Search
CPC ......... B64G 1/405; B64G 1/26; F03H 1/0006; F03H 1/00; F02K 9/90; F02K 9/84
See application file for complete search history.

(56) References Cited

U.S. PATENT DOCUMENTS

| | | | |
|---|---|---|---|
| 5,284,309 A * | 2/1994 | Salvatore | B64G 1/402 244/135 C |
| 6,032,904 A * | 3/2000 | Hosick | B64G 1/26 244/169 |

(Continued)

FOREIGN PATENT DOCUMENTS

| EP | 0 937 644 A2 | 8/1999 |
|---|---|---|
| EP | 1 227 037 A2 | 7/2002 |

OTHER PUBLICATIONS

European Search Report issued in counterpart European Application No. 14003653.4 dated May 4, 2015 (Seven (7) pages).

*Primary Examiner* — Gerald L Sung
*Assistant Examiner* — William L Breazeal
(74) *Attorney, Agent, or Firm* — Crowell & Moring LLP (57) ABSTRACT

An electrically powered propulsion system for a spacecraft includes a first center of gravity at a first time of operation and a second center of gravity at a second time of operation, where the second center of gravity is different from the first center of gravity. The electrically powered propulsion system includes a thruster realignment mechanism and at least two thrusters coupled to the thruster realignment mechanism. Each of the at least two thrusters has an individual thrust vector. The thruster realignment mechanism is adapted such that, in a first position, the individual thrust vectors of the at least two thrusters pass through the first center of gravity and that, in a second position, the individual thrust vectors of the at least two thrusters pass through the second center of gravity. The thruster realignment mechanism holds the first position in the event all of the at least two thrusters are without any failure. In addition, the thruster realignment mechanism realigns the thrusters to (Continued)

the second position in the event of at least one of (i) a failure of one of the at least two thrusters, and (ii) a predetermined time criterion is fulfilled.

16 Claims, 4 Drawing Sheets

(51) Int. Cl.
*F02K 9/84* (2006.01)
*F03H 1/00* (2006.01)
*B64G 1/26* (2006.01)

(56) References Cited

U.S. PATENT DOCUMENTS

2004/0164205 A1   8/2004  Kellberg
2005/0077425 A1*  4/2005  Payette .................. B64G 1/409
                                              244/62

* cited by examiner

ELECTRICALLY POWERED PROPULSION SYSTEM FOR USE IN A SPACECRAFT

CROSS REFERENCE TO RELATED APPLICATION

This application claims priority under 35 U.S.C. § 119 from German Patent Application No. 14 003 653.4, filed Oct. 28, 2014, the entire disclosure of which is herein expressly incorporated by reference.

TECHNICAL FIELD OF THE INVENTION

The invention relates to an electrically powered propulsion system for use in a spacecraft that comprises a first center of gravity at a first time of operation and a second center of gravity at a second time of operation, wherein the second center of gravity is different from the first center of gravity. The invention further relates to a method for operating an electrically powered propulsion system for use in a spacecraft.

BACKGROUND OF THE INVENTION

An electrically powered propulsion system is a form of electric propulsion used for spacecraft propulsion that creates thrust by accelerating ions or plasma. Because the total thrust of a single electric thruster (thruster) is low, an electrically powered propulsion thruster (EP thruster) for a spacecraft consists of the plurality of single thrusters. In addition to the increased total thrust some redundancy can be achieved.

For propulsion systems that are meant to impart delta v as opposed to torques, the total thrust vector, which is defined as the geometric addition of all thrust vectors of all individual thrusters, must pass through the spacecraft center of gravity (CoG). Typically, the plurality of thrusters is oriented in parallel. This assures that the resulting force passes through the spacecraft center of gravity, both at the beginning of life (BoL) and at the end of life (EoL). However, there are several issues which complicate the requirement that the total thrust vector passes through the center of gravity. First, an initial thruster alignment may be imperfect. Second, the thrust vector may deviate from the center axis of the thruster, both initially and over time. Third, the thrust vector may be influenced by external factors, such as an earth magnetic field or a magnetorquer field. Fourth, the center of gravity moves over time as a propellant of the electric propulsion thruster is being depleted. Fifth, one or more thrusters may fail during operation.

Although the above stated problems affect all kind of propulsion systems, it is to be noted that its solution is most urgent in the case of electrical propulsion. Standard chemical propulsion systems provide high force and thrusters are relatively inexpensive. As a result, any offset of the total thrust vector from the center axis of the thruster is usually compensated by impulses from additional thrusters.

However, this approach used for chemical propulsion systems cannot be transferred to electric propulsion systems due to its low thrust and very high cost per thruster.

To match the total thrust vector with the center of gravity of the spacecraft, thruster pointing mechanisms may be used. However, thruster pointing mechanisms are heavy, difficult to test, expensive and take up significant space. Alternatively, it is known to use an internal balance mass, e.g. on a spindle, to adjust the center of gravity. However, with a balance mass only very minor shifts can be achieved.

Considerations to accept some offset between the total thrust vector and the center of gravity lack from the fact that it is difficult to compensate the resulting torque. However, the resulting torque builds up very quickly.

One possible mitigation is a 180° roll maneuver of the spacecraft, which balances out the influence of the offset. However, this takes a significant amount of time, during which the power generation of the array is impaired.

Furthermore, the offset between the total thrust vector and the center of gravity may be counteracted by wheels which need to be de-saturated somehow. This might be done with the help of magnetorquers. However, these are only efficient in low earth orbits (LEO), while most applications for electric propulsion systems either are in medium or geostationary orbits (MEO, (GEO) or during the transfers there.

SUMMARY OF THE INVENTION

It is therefore an object of the present invention to provide an electrically powered propulsion system for use in a spacecraft as well as a method for operating an electrically powered propulsion system for use in a spacecraft that are able to eliminate or at least reduce spurious torques associated with the loss of one or several electric thrusters.

According to a first aspect of the present invention, an electrically powered propulsion system for use in a spacecraft that comprises a first center of gravity at a first time of operation, a second center of gravity at a second time of operation, wherein the second center of gravity is different from the first center of gravity. The electrically powered propulsion system comprises a thruster realignment mechanism, and at least two electric thrusters coupled to the thruster realignment mechanism, each of the at least two electric thrusters having an individual thrust vector. The thruster realignment mechanism is adapted such that, in a first position, the individual thrust vectors of the at least two thrusters pass through the first center of gravity and such that, in a second position, the individual thrust vectors of the at least two thrusters pass through the second center of gravity. The thruster realignment mechanism initially holds the first position in case all of the at least two thrusters are without any failure. The thruster realignment mechanism realigns the thrusters to the second position in case that one of the at least two thrusters has a failure and/or a predetermined time criterion is fulfilled.

For example, the first center of gravity (CoG) may correspond to the center of gravity at beginning of life (BoL) of the spacecraft. The second center of gravity may correspond to the center of gravity at the end of life (EoL) of the spacecraft. The correspondence could be vice versa, too.

According to an embodiment of the invention, by virtue of the thruster realignment mechanism having its first position, all thrusters may be aligned such that the individual thrust vectors pass through the center of gravity at beginning of life. Should a single thruster failure occur near beginning of life of the propulsion system, no torque is generated. As a result, a spacecraft equipped with a propulsion system according to the invention is slightly turned such that the new resulting force is in the required direction.

As a result, if a single thruster fails at beginning of life, the thrust of the remaining thruster will still pass through the first (initial) center of gravity. At a later time, when the center of gravity has shifted, the thruster realignment mechanism assumes the second position so that again the remaining thrust passes through the second, i.e. new, center of gravity.

On the other side, should a single thruster failure occur near the end of life, the thrusters of the propulsion system are realigned to the second position of the thruster realignment mechanism. The second position has been predetermined such that the individual thrust vectors now pass through the center of gravity at end of life, i.e. the second center of gravity. This realignment is identical for all thrusters, irrespective of which thruster failed or how many thrusters failed.

The propulsion system as suggested can replace expensive, complex and potentially unreliable gimbals for many applications of electric propulsion. In contrast to gimbals, which are used in prior art arrangements, a thruster realignment mechanism according to the invention is much cheaper. The propulsion system according to the invention eliminates and drastically reduces spurious torques associated with the loss of one or several individual thrusters. Potentially remaining spurious torques can then be counteracted with the help of other means, such as reaction wheels and/or magnetorquers and/or conventional propulsion systems, such as cold gas.

According to a preferred embodiment the thruster realignment mechanism is made such that in case of a failure of one or more of the thrusters and/or the predetermined time criterion is fulfilled all thrusters are realigned from the first position to the second position of the thruster realignment mechanism. As a result, the thruster realignment mechanism can be provided as a low-complex component.

According to a further preferred embodiment the thruster realignment mechanism is made such that in case of a failure of one or more of the thrusters and/or the predetermined time criterion is fulfilled the realignment (of their individual thrust vectors) is identical for all thrusters of the propulsion system irrespective which and/or how many of the thrusters fail. As a result, the thruster realignment mechanism can be provided as a low complexity and comparably cheap component.

According to a further preferred embodiment the at least two thrusters are coupled to the thruster realignment mechanism such that, in its first position, a resulting force generated by all thrusters having no failure passes through both the first center of gravity and the second center of gravity, i.e. the center line of the spacecraft while the individual thrust vectors of the thrusters are inclined by a first angle with regard to the direction of the resulting force, i.e. the center axis of the EP system. Although so called "cosine losses" occur, which result when a thrust vector is not perfectly aligned with the desired direction of delta v, they are very small. Should one thruster fail (which is unlikely to take place early in the mission), the remaining thrusters will be oriented such that their individual thrust vectors pass through the second position of center of gravity expected later in the mission.

According to a further preferred embodiment, after realignment to the second position, the at least two thrusters are inclined by a second angle with regard to the direction passing through both the first center of gravity and the second center of gravity, i.e. the center line or center axis of the propulsion system, wherein the second angle is different from the first angle.

In other words, the thruster realignment mechanism provides different inclination angles of the individual thrust vectors depending on the position of the thruster realignment mechanism. Hence, by changing from the first position to the second position, it is possible to realign the individual thrust vectors of the thrusters of the propulsion system to either pass through the first center of gravity or the second center of gravity.

For example, the angular difference between the first and the second angle may be less than HP, preferably less than 5°. As a result, as a worst case, the cosine losses at any given time are smatter than 1- cos (10°), which is less than 2%. Averaged over the mission duration, the cosine loss is even less.

According to a further preferred embodiment the thruster realignment mechanism is bi-stable between the first and the second position, wherein the first and the second position are end stops. As an advantage, the position of the thruster realignment mechanism can be precisely determined by the first and the second position as end stops. This can be insured at any given time. No complex and error prone sensors are needed. An articulation torque of the bi-stable thruster realignment mechanism is strong enough to overwhelm any resistance torque, e.g. by cables and hoses connecting to the propulsion system. Conventional thruster pointing mechanism use an articulation with two degrees of freedom, each of which has to work on a continuum and has to be controlled by sensors with the help of a complex feedback loop.

According to a further preferred embodiment the thruster realignment mechanism is adapted such that its reached second position is irreversible after actuation. For example, the thruster realignment mechanism may comprise a non-explosive actuator being triggered by means of pyrotechnics or a release mechanism. For example, a non-explosive actuator could be cut. This embodiment further simplifies the mechanical design.

As an alternative, the thruster realignment mechanism is adapted such that its reached second position is reversible after actuation. This can be realized by using an electric magnet and/or bi-stable spring which are able to actuate the thruster realignment mechanism from its first position to its second position and vice versa.

According to a further preferred embodiment the thruster realignment mechanism allows flipping between the first and the second position. While a bi-stable mechanism has the disadvantage that it cannot achieve a continuous articulation, i.e. it cannot assume any intermediate setting, this can be compensated by flipping between the two end stops, i.e. the first and the second position of the thruster realignment mechanism. Thus, an averaging over time is achieved. As an example, if an offset of 80% of maximum is required, then the thruster realignment mechanism directs the maximum articulation for 80% of the time and no articulation for the remaining 20% of the time. This is made possible by very small cosine losses for small angles on the order of 10° or less.

According to a further preferred embodiment the thruster realignment mechanism comprises a first plate and a second plate, which are joined by a hinge which is arranged in a center line defined by a straight line that passes through both the first center of gravity and the second center of gravity, and whose far ends are coupled to a body (e.g. the spacecraft of a construction plate of the propulsion system). At their far ends, the plates may rest on a spring or motorized mechanism. Thus both plates have an identical though opposing inclination at any given state of the spring or motorized mechanism. At least one thruster is mounted to the first plate and at least one thruster is mounted to the second plate. The number of thrusters and the arrangement of thrusters mounted to the first and the second plate are identical. An inclination angle of the first plate and the second plate changes the direction of the thrust vectors passing through the first center of gravity and the second center of gravity respectively. The center line (axis) of the spacecraft passes through the hinge between the first and the second plate. With help of the couplings between the first and the second plate to the spacecraft and the hinge between the plates it is possible to adjust the inclination of the thrust vectors relative to the center axis of the spacecraft.

In one alternative, the coupling of the far ends of the first and the second plate to the body is pivotable, respectively, while the distance between the hinge relative to the body is variable.

According to a second aspect of the present invention, a method for operating an electrically powered propulsion system according to the description above comprises the steps of: adjusting the thruster realignment mechanism to the first position such that the individual thrust vectors of the at least two thrusters pass through a first center of gravity in case all of the at least two thrusters are without any failure while a resulting force generated by all thrusters passes through both the first center of gravity and the second center of gravity; and adjusting the thruster realignment mechanism to a second position, such that the individual thrust vectors of the at least two thrusters pass through a second center of gravity in case that one of the least two thrusters has a failure and/or the predetermined time criterion is fulfilled to realign thrust of the propulsion system.

According to a further preferred embodiment for adjusting the thruster realignment mechanism to the second position, a deflection of the ion beam released by the non-failed thrusters is made. Alternatively, for adjusting the thruster realignment mechanism to the second position, controlling of a mechanical rotation of the thrusters is made.

The invention will be described in more detail by reference to the accompanying figures.

DETAILED DESCRIPTION OF THE EXEMPLARY EMBODIMENTS

Figure 1:
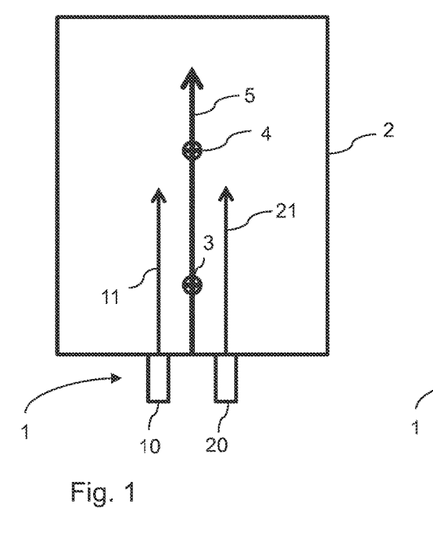
FIG. 1 shows a spacecraft with a conventional electrically powered propulsion (EP) system with all thrusters arranged with parallel thrust vectors.

FIG. 1 shows a known electrically powered propulsion system 1 (in the following: EP system) for a spacecraft 2. The spacecraft 2 has an initial center of gravity 3 (first center of gravity) and a later center of gravity 4 (second center of gravity). The spacecraft 2 can comprise a propellant for the EP system. The first or initial center of gravity 3 may correspond to the center of gravity' of the spacecraft at the beginning of life (BoL). The second or later center of gravity 4 may correspond to the center of gravity at the end of life (EoL). The first and the second center of gravity 3, 4 are located in the center axis (sometimes referred to as a "center line") of the spacecraft 2. The EP system comprises a set of EP thrusters (in the following: thruster) 10, 20, i.e. an even number of thrusters. In the present examples the EP system consists of two thrusters. Each of the thrusters 10, 20 has an individual thrust vector 11, 21. Since the thrusters 10, 20 are oriented in parallel, the individual thrust vectors 11, 21 are in parallel, too. Thus, as long as both thrusters 10, 20 perform nominally, a resulting force 5 passes through both the first and the second center of gravity 3, 4, i.e. coincides with the center axis of the spacecraft 1. Furthermore, as long as all thrusters work as intended no cosine losses occur.

Figure 2:
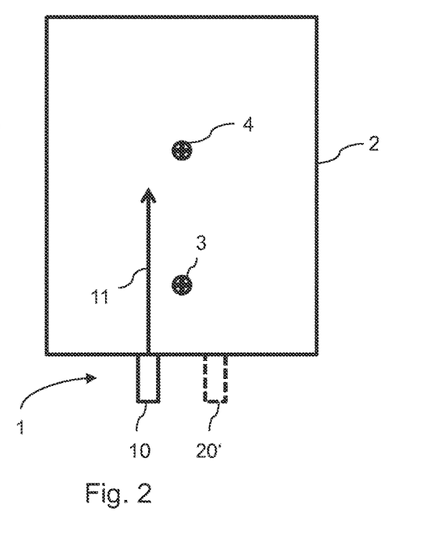
FIG. 2 shows the conventional EP system of FIG. 1 with one thruster having a malfunction.

FIG. 2 shows the configuration of FIG. 1 where the thruster 20 has a malfunction. This is indicated by the dotted line and the reference numeral 20' of the thruster 20. As a result, only thruster 10 has a thrust vector 11 which produces a force that corresponds to the overall resulting force 5. In this case, the resulting force 5 passes neither through the first nor through the second center of gravity 3, 4. Hence, a significant torque is generated that needs to be counterbalanced.

Figure 3:
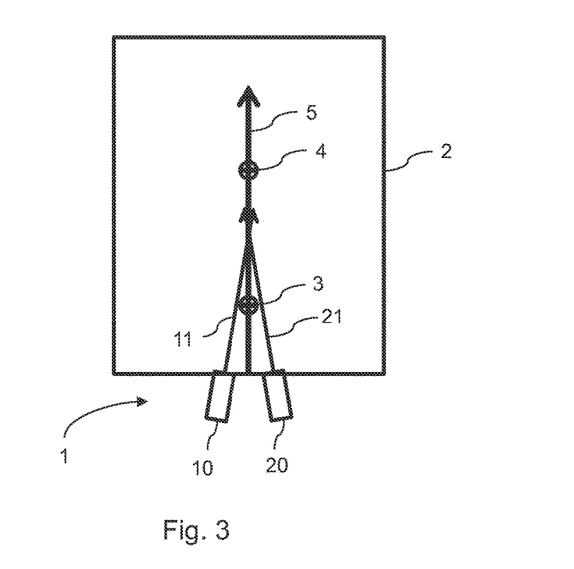
FIG. 3 shows a spacecraft with a conventional EP system where the thrusters are statically aligned at a slight angle.

An alternative known EP system 1 is illustrated in FIG. 3. In this alternative, the thrusters 10, 20 are statically aligned at a slight cant angle. Thus, the resulting force 5 passes through both the first center of gravity 3 as well as the second center of gravity 4. There are no cosine losses as long as both thrusters 10, 20 perform nominally. Hone thruster has a malfunction (e.g. thruster 10) the remaining thruster (e.g. thruster 20) has a force 21 which creates a small torque with respect to the first (initial) center of gravity 3 and a small opposite torque with respect to the second (later) center of gravity 4. There is a small cosine loss as long as both thrusters perform nominally and no cosine loss if only one thruster (e.g. thruster 20) is operating. Because of the small angle of around 5° with respect to the direction of the center axis the cosine-loss is negligible. In case that one of the thrusters 10, 20 has a malfunction, the new resulting force generates less torque compared to the torque of FIG. 2.

Figure 4:
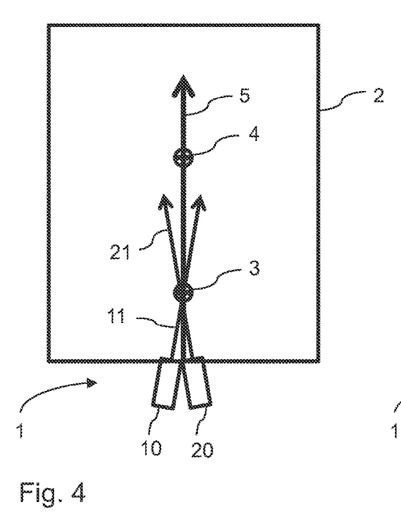
FIG. 4 shows an EP system according to the invention in which its thrusters are held in a first position.

FIG. 4 shows an EP system 1 for the spacecraft 2 according to the invention. In general, the thrusters 10, 20 are inclined such that, in a first position, the individual forces 11, 21 pass through the first (initial) center of gravity 3. The thrust vectors 11, 21 of thruster 10, 20 produce a resulting force 5 that passes through both the first center of gravity as through the second (later) center of gravity 4. There are small cosine losses which depend on the inclination angle of the individual thrust vectors with respect to the center axis.

Figure 5:
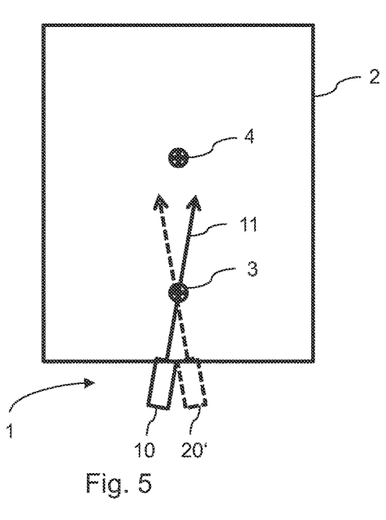
FIG. 5 shows the EP system of the invention of FIG. 4 where one thruster has a malfunction.

Since the first center of gravity 3 is the center of gravity at the beginning of life of the spacecraft 2, a failure which occurs near the beginning of life generates no torque as shown in FIG. 5. As before, it is assumed that thruster 20 has a malfunction and therefore is shown with a dotted line and depicted with reference numeral 20'. Now, i,e. no realignment has been made yet, the force of the remaining thruster 10 is at the same time the resulting force 5. It passes through the first (initial) center of gravity 3. There are no cosine losses.

Figure 6:
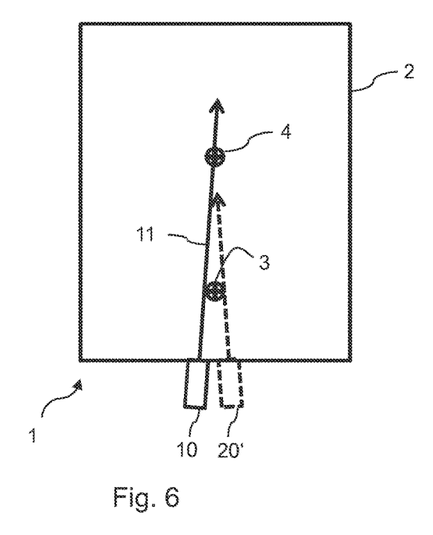
FIG. 6 shows the EP system of the invention of FIG. 4 where the thrusters are realigned to a second position.

However, should the failure of thruster 20 occur near end of life where the center of gravity of the spacecraft 2 corresponds to the second center of gravity 4, the generated torque by thruster 10 would be even larger. Therefore, should a failure occur near the end of life, all thrusters irrespective of which thruster failed are realigned by a few degrees to a second position. This is shown in FIG. 6. In this second position the individual thrust vectors 11, 21 of all thrusters 10, 20 pass through the second center of gravity 4. It is to be noted that thruster 20' still has a malfunction and therefore does not generate a force, while the remaining thruster 10 produces a force which is at the same time the resulting force 5. Thus no torque is generated, there are no cosine losses. The angle of realignment between the first position shown in FIG. 5 and the second position shown in FIG. 6 is less than 10°, preferably less than 5° to minimize cosine losses.

It is to be noted that the realignment of the thrusters 10, 20 may be initiated by occurrence of a failure of a thruster and/or in dependence of a predetermined time criterion which, for example, is coupled to the shifting of the center of gravity of the spacecraft 2 during its operation.

The thrust realignment of the number of thrusters 10, 20 can be achieved either by a deflection of the ion beam or by a mechanical rotation of the entire thrusters 10, 20. A deflection of their ion beans may be made by a magnetic or electrostatic deflection. However, electrostatic fields may impair the functioning of the electric thruster, particularly during startup. In this case electromagnets or permanent magnets may be used. Electromagnets require significant power, particularly in high temperature environment. Permanent magnets may exceed the Curie temperature beyond which they are no longer performing. Hence, a mechanical rotation of the entire thrusters 10, 20 is preferred.

Figure 7:
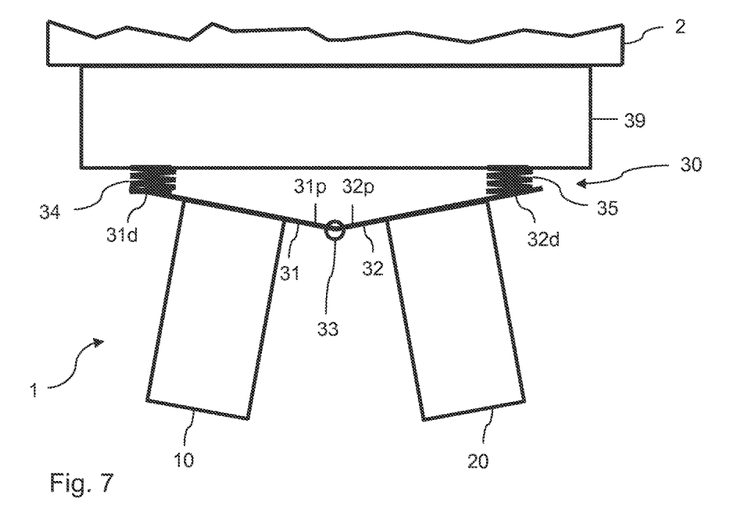
FIG. 7 shows an EP system having a thruster realignment mechanism according to a first embodiment in a first position.
Figure 8:
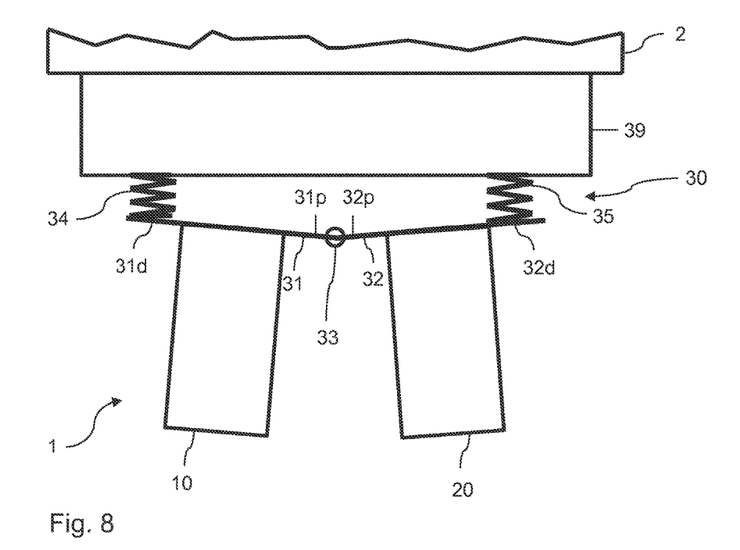
FIG. 8 shows the EP system of FIG. 7 where the thrusters are aligned to a second position.

In FIGS. 7 to 10 principle arrangements of thruster realignment mechanism 30 according to the invention are illustrated. FIG. 7 shows the thruster realignment mechanism 30 in the first position, FIG. 8 shows the thruster realignment mechanism 30 in the second position. In a first embodiment shown in FIGS. 7 and 8 a thruster realignment mechanism 30 comprises a first plate 31 and a second plate 32. The first thruster 10 is coupled to the first plate 31, the second thruster 20 is coupled to the second plate 32. A coupling between the thrusters 10, 20 and the first and the second plate 31, =is made such that their individual thrust vectors are in a right angle with respect to the plate's planes. The coupling at adjacent ends 31p, 32p of the plates 31, 32 may be made by a hinge which is arranged in the center line or axis of the spacecraft 2. The center line passes through both the first center of gravity 3 and the second center of gravity 4. Far ends 31d, 32d of the first and the second plates 31, 32 are coupled to a construction or base plate 39 or directly to the spacecraft 2. Coupling may be made by springs 34, 35 or a motorized mechanism (not shown).

The realignment mechanism 30 is hinged in the center and can be actuated, for example, by a spring force after a retaining element (not shown) has been released. As can be seen from FIG. 8 showing the second position of the thruster realignment mechanism where the spring forces of the springs 34, 35 are released, the angle of the thrust vectors 11, 21 with respect to the center axis has been changed in comparison to the first position shown in FIG. 7.

The realignment mechanism can be made such that the articulation is irreversible (see the embodiments in FIGS. 7 and 8). In this case the release mechanism could be realized by a pyro element or cutting of a non-explosive actuator. This arrangement can help reduce the center of gravity offset, e.g. in the case of a thruster failure.

Figure 9:
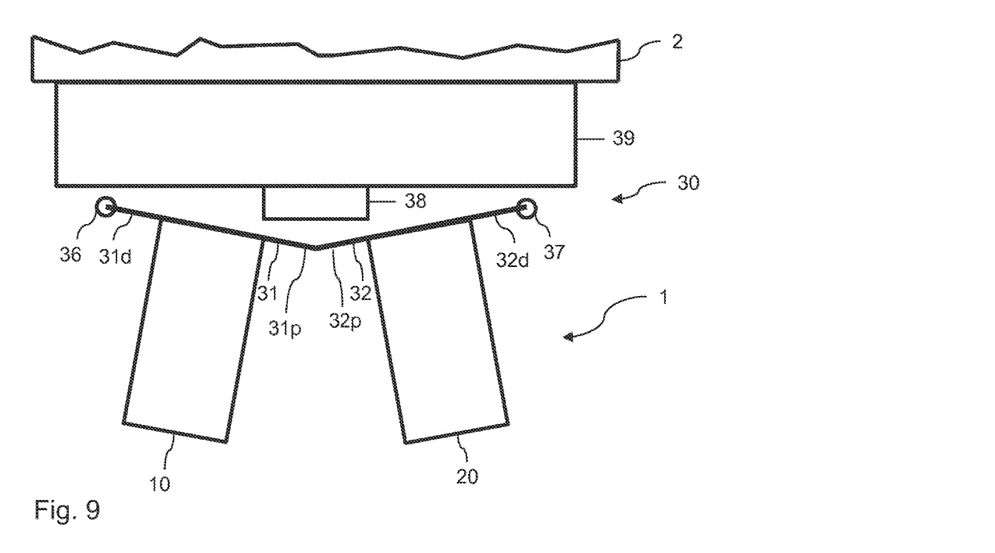
FIG. 9 shows an EP system having a thruster realignment mechanism according to a second embodiment, in a first position.
Figure 10:
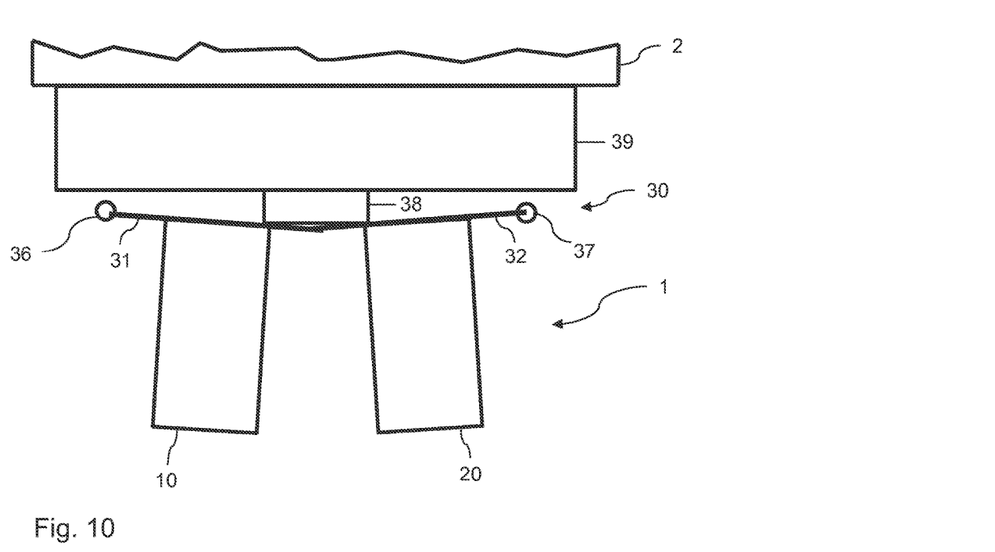
FIG. 10 shows the EP system of FIG. 9 where the thrusters are realigned to a second position.

FIGS. 9 and 10 show a second embodiment of the thruster realignment mechanism 30. FIG. 9 shows the EP system 1 in its first position, FIG. 10 shows the EP system 1 in its second position. In this embodiment the plates 31, 32 are hinged at their far ends 31d, 32d by a first and a second outer joint or hinge 36, 37. Opposite to the pivotable coupling at the adjacent ends 31p, 32p an electromagnet or other reversible actuator 38 is arranged at the base plate 39 or the spacecraft body 2. As soon as the electromagnet 38 is actuated the plates 31, 32 are pulled against the electromagnet overcoming a small spring force (not shown) resulting in a change of the direction of the thrust vectors 11, 21.

The arrangement shown in FIGS. 9 and 10 allows to make the articulation of the realignment mechanism reversible. If the electromagnet or other reversible actuator is released the spring force pushes the plates out to their end stops (not shown in FIG. 9).

Although the examples illustrated in FIGS. 4 to 10 are only schematic it is clear to the person skilled in the art that a bi-stable mechanism is provided that articulates the thrusters. The position of the realignment mechanism 30 can be precisely determined at any given time. The articulation torque to articulate the realignment mechanism can be made strong enough to overwhelm any unwanted resistance torque, e.g. by cables and hoses connecting to the thrusters 10, 20.

Although the embodiments illustrated show a realignment mechanism having only a single axis, a realignment mechanism having two or more axes would be possible.

Such a simple bi-stable articulation mechanism allows to use thrusters of small force for delta v maneuvers without any additional balancing thrusters, even in the case of failure of some thrusters. This saves considerable amounts of mass, space, integration and testing time as well as cost when compared to a full-blown thruster pointing mechanism.

Although in the present examples only an EP system 1 having two single thrusters is shown, it is to be understood that such an EP system 1 could have more than two thrusters as long as the number of thrusters are arranged in pairs.

REFERENCE LIST 1 electrically powered propulsion system (EP system)
2 spacecraft
3 first center of gravity, e.g. at beginning of life (BoL)
4 second center of gravity, e.g. at end of life (EoL)
5 resulting force
10 first thruster
11 first thrust vector
20 second thruster
20' second thruster having a failure
21 second thrust rector
30 thruster realignment mechanism
31 first plate
31d adjacent end of first plate
31p far end of first plate
32 second plate
32d adjacent end of second plate
32p far end of second plate
33 joint
34 first spring
35 second spring
36 first outer joint
37 second outer joint
38 magnet
39 base plate

What is claimed is:

1. An electrically powered propulsion system for a spacecraft that comprises a first center of gravity at a first time of operation and a second center of gravity at a second time of operation, wherein the second center of gravity is different from the first center of gravity, wherein the electrically powered propulsion system comprises a thruster realignment mechanism and at least two thrusters coupled to the thruster realignment mechanism, each of the at least two thrusters having an individual thrust vector, wherein the thruster realignment mechanism is adapted such that, in a first position, individual thrust vectors of the at least two thrusters pass through the first center of gravity and that, in a second position, individual thrust vectors of the at least two thrusters pass through the second center of gravity;

the thruster realignment mechanism holds the first position in the event all of the at least two thrusters are without any failure;

the thruster realignment mechanism realigns the at least two thrusters to the second position in the event of at least one of (i) a failure of one of the at least two thrusters, and (ii) a predetermined time criterion is fulfilled, wherein the thruster realignment mechanism is adapted such that the second position once reached is reversible after actuation, and wherein the actuation mechanism comprises a bi-stable spring arrangement for realigning the at least two thrusters.

2. The electrically powered propulsion system according to claim 1, wherein the thruster realignment mechanism is made such that in the event of the at least one of (i) the failure of one of the at least two thrusters, and (ii) the predetermined time criterion is fulfilled, all thrusters are realigned from the first position to the second position.

3. The electrically powered propulsion system according to claim 1, wherein the at least two thrusters are coupled to the thruster realignment mechanism such that, in the first position, resulting force generated by all thrusters having no failure passes through both the first center of gravity and the second center of gravity, while individual thrust vectors of each thruster of the at least two thrusters are inclined by a first angle with regard to a direction of the resulting force.

4. The electrically powered propulsion system according to claim 3, wherein, after realignment to the second position, the at least two thrusters are inclined by a second angle with regard to the direction passing through both the first center of gravity and the second center of gravity wherein the second angle is different from the first angle.

5. The electrically powered propulsion system according to claim 4, wherein an angle difference between the first and the second angle is less than 10°.

6. The electrically powered propulsion system according to claim 1, wherein the thruster realignment mechanism is bi-stable between the first and the second position, wherein the first position and the second position are end stops.

7. An electrically powered propulsion system for a spacecraft that comprises a first center of gravity at a first time of operation and a second center of gravity at a second time of operation, wherein the second center of gravity is different from the first center of gravity, wherein the electrically powered propulsion system comprises a thruster realignment mechanism and at least two thrusters coupled to the thruster realignment mechanism, each of the at least two thrusters having an individual thrust vector, wherein the thruster realignment mechanism is adapted such that, in a first position, individual thrust vectors of the at least two thrusters pass through the first center of gravity and that, in a second position, individual thrust vectors of the at least two thrusters pass through the second center of gravity;

the thruster realignment mechanism holds the first position in the event all of the at least two thrusters are without any failure;

the thruster realignment mechanism realigns the at least two thrusters to the second position in the event of at least one of (i) a failure of one of the at least two thrusters, and (ii) a predetermined time criterion is fulfilled, wherein the thruster realignment mechanism is adapted such that the second position once reached is irreversible after actuation, and wherein the actuation mechanism comprises a bi-stable spring arrangement for realigning the at least two thrusters.

8. The electrically powered propulsion system according to claim 1, wherein the thruster realignment mechanism comprises an electric magnet or other reversible actuator arrangement for realigning the at least two thrusters.

9. The electrically powered propulsion system according to claim 1, wherein the thruster realignment mechanism allows flipping between the first position and the second position.

10. The electrically powered propulsion system according to claim 1, wherein the thruster realignment mechanism is made such that in the event of the at least one of (i) the failure of one of the at least two thrusters, and (ii) the predetermined time criterion is fulfilled, the thruster realignment mechanism realigns all thrusters the second position irrespective of which or how many thrusters fail.

11. An electrically powered propulsion system for a spacecraft that comprises a first center of gravity at a first time of operation and a second center of gravity at a second time of operation, wherein the second center of gravity is different from the first center of gravity, wherein the electrically powered propulsion system comprises a thruster realignment mechanism and at least two thrusters coupled to the thruster realignment mechanism, each of the at least two thrusters having an individual thrust vector, wherein the thruster realignment mechanism is adapted such that, in a first position, the individual thrust vectors of the at least two thrusters pass through the first center of gravity and that, in a second position, the individual thrust vectors of the at least two thrusters pass through the second center of gravity;

the thruster realignment mechanism holds the first position in the event all of the at least two thrusters are without any failure;

the thruster realignment mechanism realigns the at least two thrusters to the second position in the event of at least one of (i) a failure of one of the at least two thrusters, and (ii) a predetermined time criterion is fulfilled, wherein the thruster realignment mechanism is adapted such that the second position once reached is reversible after actuation, and wherein the thruster realignment mechanism comprises a first plate and a second plate, which are joined by a hinge which is arranged in a center line defined by a straight line that passes through both the first center of gravity and the second center of gravity, and whose far ends are coupled to a body, wherein at least one thruster is mounted to the first plate and at least one thruster is mounted to the second plate, and wherein an inclination angle of the first plate and the second plate is changeable with regard to the center line between the first position or the second position.

12. A method for operating the electrically powered propulsion system according to one of the preceding claims, comprising the steps of:
adjusting the thruster realignment mechanism to the first position, such that individual thrust vectors of the at least two thrusters pass through the first center of gravity in case all of the at least two thrusters are without any failure while resulting force generated by all thrusters passes through both the first center of gravity and the second center of gravity; and
adjusting the thruster realignment mechanism to the second position, such that the individual thrust vectors of the at least two thrusters pass through the second center of gravity in the event of at least one of (i) the failure of one of the at least two thrusters, and (ii) the predetermined time criterion is fulfilled, to realign thrust of the electrically powered propulsion system,
wherein adjusting the thruster realignment mechanism comprises aligning all thrusters, irrespective of which or how many thrusters fail, in the event of the at least one of (i) the failure of one of the at least two thrusters, and (ii) the predetermined time criterion is fulfilled.

13. The method according to claim 12, wherein adjusting the thruster realignment mechanism to the second position comprises deflecting an ion beam released by any non-failed thrusters.

14. The method according to claim 12, wherein adjusting the thruster realignment mechanism to the second position comprises controlling a mechanical rotation of the thrusters.

15. The method according to claim 12, wherein adjusting the thruster realignment mechanism comprises realigning all thrusters from the first position to the second position in the event of the at least one of (i) the failure of one of the at least two thrusters, and (ii) the predetermined time criterion is fulfilled.

16. The method according to claim 12, further comprising coupling the at least two thrusters to the thruster realignment mechanism such that, in the first position, resulting force generated by all thrusters having no failure, passes through both the first center of gravity and the second center of gravity, while individual thrust vectors of the at least two thrusters are inclined relative to a net thrust of the at least two thrusters.

* * * * *